United States Patent [19]

Nishida et al.

[11] Patent Number: 5,406,273
[45] Date of Patent: Apr. 11, 1995

[54] DATA PROCESSOR

[75] Inventors: Hiroshi Nishida, Tenri; Kenji Nishimiya, Nara; Yasumasa Yamanaka, Yamatokoriyama; Yukihiko Ueno, Souraku; Yoshito Kataoka, Ikoma; Hirofumi Nishikawa, Yao; Masaharu Satoh; Yoshitugu Maekawa, both of Nara, all of Japan

[73] Assignee: Sharp Kabushiki Kaisha, Osaka, Japan

[21] Appl. No.: 279,820

[22] Filed: Jul. 25, 1994

Related U.S. Application Data

[63] Continuation of Ser. No. 878,460, May 5, 1992, abandoned.

[30] Foreign Application Priority Data

May 14, 1991 [JP] Japan ................................. 3-109300
May 14, 1991 [JP] Japan ................................. 3-109301

[51] Int. Cl.⁶ .................... H04Q 5/00; G08C 19/00; H03M 11/02; G06F 13/26
[52] U.S. Cl. .................... 340/825.51; 340/825.68; 341/24; 345/168; 364/234.4; 364/262.3; 364/928.5
[58] Field of Search ........... 340/825.5, 825.51, 825.52, 340/825.56, 825.68, 825.69, 825.72, 711; 341/22, 24, 34; 364/234, 234.1, 234.2, 234.3, 234.4, 262, 262.1, 262.2, 262.3, 928, 928.1, 928.2, 928.3, 928.4, 928.5, 928.6, 419.17; 345/156, 168, 169, 192; 371/59; 359/152, 154

[56] References Cited

U.S. PATENT DOCUMENTS

| | | | |
|---|---|---|---|
| 3,932,838 | 1/1976 | Sitter | 341/24 |
| 4,064,560 | 12/1977 | Baxter | 341/24 |
| 4,313,227 | 1/1982 | Eder | 340/711 |
| 4,323,888 | 4/1982 | Cole . | |
| 4,326,201 | 4/1982 | Enokizono | 345/192 |
| 4,482,955 | 11/1984 | Amano et al. | 341/22 |
| 4,739,310 | 4/1988 | Yamamoto | 340/711 |
| 4,739,316 | 4/1988 | Yamaguchi et al. | 340/711 |
| 4,779,079 | 10/1988 | Hauck | 345/168 |
| 4,843,570 | 6/1989 | Sugitani | 345/192 |
| 4,872,004 | 10/1989 | Bahnick et al. | 340/825.51 |
| 4,882,580 | 11/1989 | Teranishi et al. | 340/825.5 |
| 4,965,560 | 10/1990 | Riley | 340/711 |
| 4,985,890 | 1/1991 | Matsumoto et al. | 340/825.5 |
| 5,075,792 | 12/1991 | Brown et al. | 359/152 |
| 5,136,694 | 8/1992 | Belt et al. | 341/22 |
| 5,175,672 | 12/1992 | Conner et al. . | |
| 5,189,543 | 2/1993 | Lin et al. | 359/154 |
| 5,245,603 | 9/1993 | Newman | 340/825.5 |
| 5,247,285 | 9/1993 | Yokota et al. | 345/169 |
| 5,263,171 | 11/1993 | Asprey | 340/825.5 |
| 5,293,314 | 3/1994 | Sakai | 364/419.17 |

FOREIGN PATENT DOCUMENTS

| | | | |
|---|---|---|---|
| 190511 | 8/1986 | European Pat. Off. | 364/419.17 |
| 61-9717 | 1/1986 | Japan . | |
| 61-103229 | 5/1986 | Japan . | |
| 61-103230 | 5/1986 | Japan . | |
| 62-168218 | 7/1987 | Japan . | |

OTHER PUBLICATIONS

Alexander, G. A.; "Editorial Tools for Better Writing"; pp. 10-3 to 10-18; *The Seybold Report on Publishing Systems.*

*Primary Examiner*—Sandra L. O'Shea
*Assistant Examiner*—Mark H. Rinehart
*Attorney, Agent, or Firm*—Nixon & Vanderhye

[57] ABSTRACT

A data processing apparatus receives key codes corresponding to keys depressed on a plurality of keyboards. These key codes are sequentially stored in a first-in first-out (FIFO) buffer awaiting processing by a central processing unit (CPU). If successive key code entries correspond to an auto repeat key (e.g., a space key, a backspace key, an underline key, a move cursor key, etc.), a determination is made whether the auto repeat key codes are the same. If they are, the CPU processes the subsequent auto repeat key code. If they are different, the CPU ignores that auto repeat key input. In another embodiment of the present invention, one of the keyboards is hardwired to the data processing system while a second keyboard is connected via a wireless link. Auto repeat key codes are only accepted from the first wire-connected keyboard, and any auto repeat key codes from the second wireless keyboard are ignored.

7 Claims, 8 Drawing Sheets

FIG. 5

|   |   |   | FUNCTION | RELEASE | RUN |
|---|---|---|---|---|---|
| 7 | 8 | 9 | FUNC | RELE | RUN |
| 4 | 5 | 6 | × | − | ÷ |
| 1 | 2 | 3 | + | ↑ | RET — RETURN |
| 0 | , | . | ← | ↓ | → |

FIG. 6

JUMP TO THE TOP OF DOCUMENT — BEG DOC
UNDERLINE — —
SPACE
DOUBLE-WIDE CHARACTERS — DOUB

BACKSPACE — ←
PRINT, DOUB, FORMAT, ERASE, ⊂

JUMP TO THE END OF DOCUMENT — END DOC
MOVE, COPY, END DOC, RULER, ⇧, ↵ — PAGE BREAK

BLOCK, HALF, FULL, ⇐, ⇩, ⇒

CHANGING TO HALF-WIDE CHARACTERS — HALF
CHANGING TO FULL-WIDE CHARACTERS — FULL
RULER LINE — RULER

DATA PROCESSOR

This is a continuation of application Ser. No. 07/878,460, filed May 5, 1992, now abandoned.

BACKGROUND OF THE INVENTION

1. Field of the Invention

The present invention relates to a data processor, such as a word processor, a personal computer, etc., and more particularly, to a data processor in which a plurality of keyboards may be used as input devices.

2. Description of the Prior Art

In a conventional word processor categorized in the above-mentioned data processor, pressing a key on a keyboard causes a encoded key code to be buffered in a memory area (input buffer) in the processor. In a word processor in which two or more keyboards are connected to the processor, continuously pressing an auto repeat key (e.g. a space bar or cursor movement key) on separate keyboards generates, an auto repeat key code relevant to each key.

When the keyboards are incorporated into a system, for example, utilizing a wireless remote controller off TV or VTR, generally the remote controller includes a transmitting element and the main unit includes a receiving element, and thus, communication off wireless signals is conducted between these elements. As to an electronic apparatus which utilizes a wireless keyboard to conduct a remote control, Japanese Unexamined Patent Publication SHO/61-9717 discloses "A CONTROL SYSTEM FOR ELECTRONIC APPARATUS". Also, Japanese Unexamined Patent Publication SHO/62-168218 discloses "A DETACHABLE KEYBOARD" in which a keyboard can be divided into more than two keyboard units, and each of the units can transmit wireless signals Moreover, Japanese Unexamined Patent Publication SHO/61-103229 discloses a wireless connecting system between a keyboard unit and a main machine unit, and Japanese Unexamined Patent Publication SHO/61-103230 discloses a wireless key input system in which ultrasonic waves are generated as necessary In the above-mentioned conventional word processors in which two or more keyboards are connected to a main machine unit, when key codes output from two or more keyboards which are connected to a main machine unit are buffeted in separate memories, the key codes cannot be processed in the appropriate order in which they were depressed.

Also, once an auto repeat key on each keyboard is generated, key codes are randomly output when intervals of key repetition are different. Specifically, when a cursor moving key "←" key and a "SPACE" key are continuously pressed, an output state becomes random as "←", "SPACE", "←", "←" and "SPACE", and the operator often becomes confused with key input and output that results.

In using a keyboard for a main unit with a wireless input device, display of input results in response to key input for input from the wireless input device lags that on the keyboard of the main unit, and consequently, continuously pressing an auto repeat key on the wireless input device may activate a key input contrary to the operator's intent, e.g., when a delayed response to depression of a BACK SPACE key causes a created document to be erased more than intended. In addition to that, when the wireless input device is independent with its own power source, key inputs from the wireless input device are not always received by the main unit.

SUMMARY OF THE INVENTION

To overcome the disadvantages as mentioned above, the present invention provides a data processor in which data is processed in the order that keys are depressed even with a plurality of keyboards connected, and an operation corresponding to activation of an auto repeat key is accurately executed.

The present invention provides a data processor, having both a keyboard and a wireless input device, that improves response to activation of an auto repeat key in the wireless input device to prevent malfunction of the wireless input device.

In a first aspect off the present invention, a data processor which receives key codes selectively output from a plurality of keyboards to perform editing includes switch means for switching into a key interrupting processing on one of the plurality of keyboards, key code storing means allocated for both of the keyboards having a first-in-first-out (FIFO) buffer for storing a key code corresponding to a key pressed to cause a key interruption in accordance with the order of the key interruption, and reading means for reading in a first in first out system the key code stored in the key code storing means.

In the first aspect of the present invention, the data processor further includes auto repeat key control means for regarding as valid only the first activated auto repeat state of an auto repeat key pressed on one of the plurality of keyboards. In the present invention, the keyboards and a main unit of the data processor can be connected through cable and/or wireless system, and wireless signals includes infrared signals, radio wave signals, ultrasonic signals, and any other aerial propagation signals.

According to the first aspect of the present invention, when keys on the plural keyboards are pressed, key codes output from the keyboards are sequentially stored in the single first-in-first-out bluffer in the order of the key interruption, and read out from the buffer first-in-first-out. When the auto repeat key is pressed in one of the keyboards and the auto repeat key is pressed in another keyboard, the key which first activates an auto repeat state is recognized valid. In this way, even if key inputs are made on a plurality of keyboards, data processing is performed in accordance with the order in which the key were pressed, and thus, an exact key input can be executed.

In a second aspect of the present invention, a data processor includes a plurality of wireless input device each having an auto repeat key, a plurality of keyboards for editing each having an auto repeat key, an editing device for encoding key signals which are output from the wireless input device, and means for invalidating successive input from a specific auto repeat key on the wireless input device.

According to the second aspect of the present invention, when the auto repeat key on the keyboard in a main unit of the data processor is continuously pressed, key input corresponding to the pressed key is continuously executed, and when the auto repeat key on the wireless input device is continuously pressed, a first key input alone is accepted and processed. Any following key input as a result of pressing the auto repeat key thereafter is recognized as invalid.

In this way, in a situation where the keyboard in the main unit of the data processor and the wireless input device are used together and a specific auto repeat key is pressed on the wireless input device, input corresponding to that key is successively executed. Therefore, execution of data input or commands contrary to the operator's intent are prevented.

DESCRIPTION OF THE DRAWINGS

An embodiment of the invention will now be described by way of example and with reference to the accompanying drawings, in which:

FIG. 5 is a diagram for explaining a key arrangement on a cordless key unit in the embodiment according to the second aspect of the present invention;

FIG. 6 is a diagram for explaining a key arrangement which works if used together with function keys shown in FIG. 5;

DESCRIPTION OF THE PREFERRED EMBODIMENTS

Figure 1:
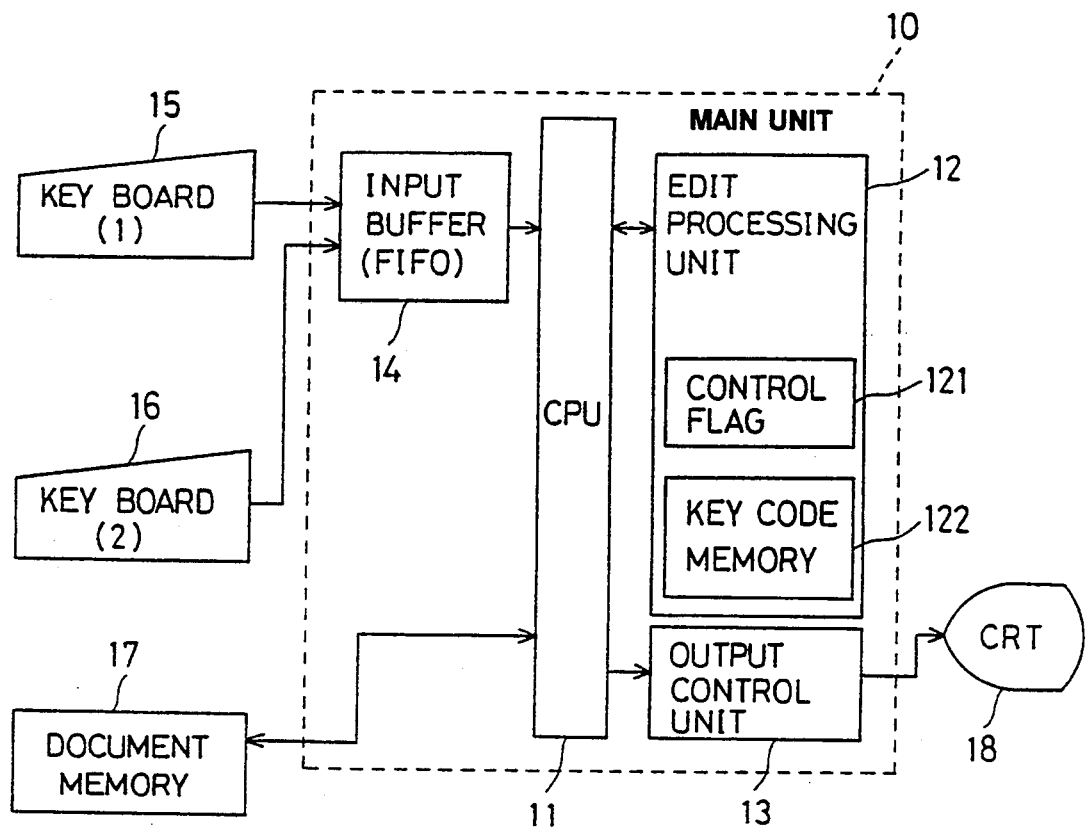
FIG. 1 is a block diagram showing an architecture of a preferred embodiment of a data processor according to a first aspect of the present invention.

FIG. 1 is a diagram showing an architecture of an embodiment in a first aspect of the present invention which is applied to a word processor. The word processor includes a main unit 10, a CPU 11, an edit processing unit 12 for performing Kana (Japanese alphabet)/Kanji (Chinese characters) conversion, an output control unit 18, and an input buffer 14, which are all connected to one another by a bus line. The input buffer 14 is connected to a keyboard (1) 15, a keyboard (2) 16 and a document memory 17, and also connected through the output control unit 13 to an external CRT 18.

In the word processor thus structured, when keys on the keyboard (1) 15 and the keyboard (2) 16 are pressed, key codes are generated. Each key code can be expressed, for example, by a numeral value of 1 byte in hexadecimal system, and can be allocated in the following way: Codes 00H–6FH are allocated to the keys on the keyboard (1) 15 while codes 70H–7FH are allocated to auto repeat keys. The auto repeat keys are defined as a key used for inputting the same character or for repeating the same function, and a specific function can be successively input, continuously pressing each of the auto repeat keys. The auto repeat keys include "SPACE", "DELETE ONE LETTER", "BACK SPACE", "MOVE CURSOR", etc.

Codes 80H–EFH are allocated to the keys on the keyboard (2) 16 while codes F0H–FFH are allocated to auto repeat keys. In such a system design, generally, in response to pressing a key, a hardware interrupt lets the main unit 10 know a corresponding key code.

in the edit processing unit 12 in the main unit 10, a character corresponding to the accepted key is stored in the input buffer 14. The edit processing unit 12 includes a control flag 121 for controlling a reception of the auto repeat keys, and a key code memory 122 reference for a determination of acceptable auto repeat keys.

Figure 2:
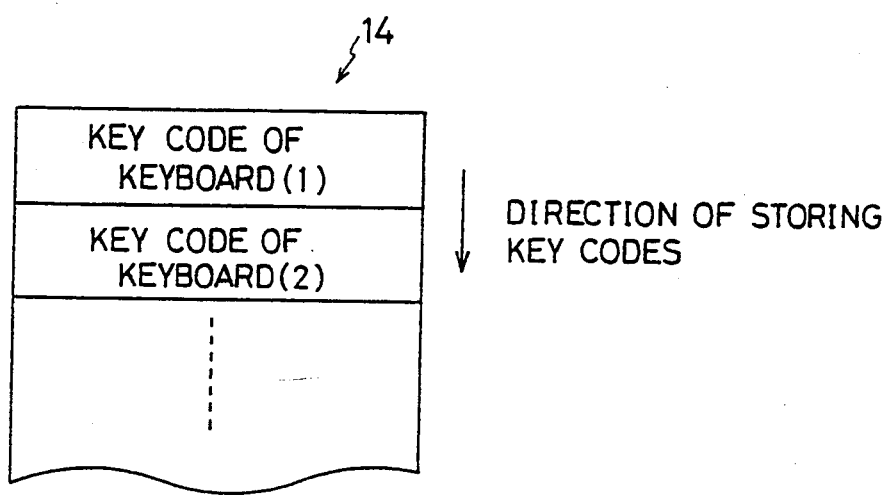
FIG. 2 is a diagram for explaining the contents stored in an input buffer shown in FIG. 1.

The input buffer 14 consists of a first in first out buffer for storing a key code corresponding to a key which is allocated to the specific keyboard and pressed when a key interruption arises and the key is pressed, and it stores a key code on the corresponding keyboard in the order of the key interruption. FIG. 2 shows the contents stored in the input buffer 14, where key codes of each keyboard are stored in the order off the key interruption.

On the other hand, the edit processing unit 12, when one of a plurality of keyboards is used, switches into a key interrupt procedure initiated by a key depression on the specific keyboard. The edit processing unit 12 also reads out key codes stored in the input buffer 14 in a first in first out procedure. The document memory 17 is for storing a document to be edited, and the CRT 18 displays the editing contents.

Operation of the key interrupt in the above-mentioned word processor will be described. First, upon pressing a key on the keyboard (1) 15, an key interrupt arises. Then, a key code corresponding to the depressed key is stored in the input buffer 14.

Likewise, pressing a key on the keyboard (2) 16 also causes a key interrupt. A key code corresponding to that key is then stored in the same input buffer 14. The input buffer 14 is composed of a FIFO list, and the edit processing unit 12 monitors whether any key codes are accumulated in the input buffer 14. Accordingly, if any key codes are accumulated, a processing routine for reading out the accumulated key codes is executed. In this processing routine the key codes are read out on "first in first out" basis in accordance with the FIFO list in buffer 14.

Thus, since the key codes of both the keyboard (1) 15 and the keyboard (2) 16 are stored in the input buffer 14, the order of the key codes stored in the input buffer 14 corresponds with the order in time in which keys were pressed. For example in FIG. 2, the key code of the keyboard (1) 15 is first read out, and then, the key code of the keyboard (2) 16 is read out of FIFO buffer 14.

Figure 3:
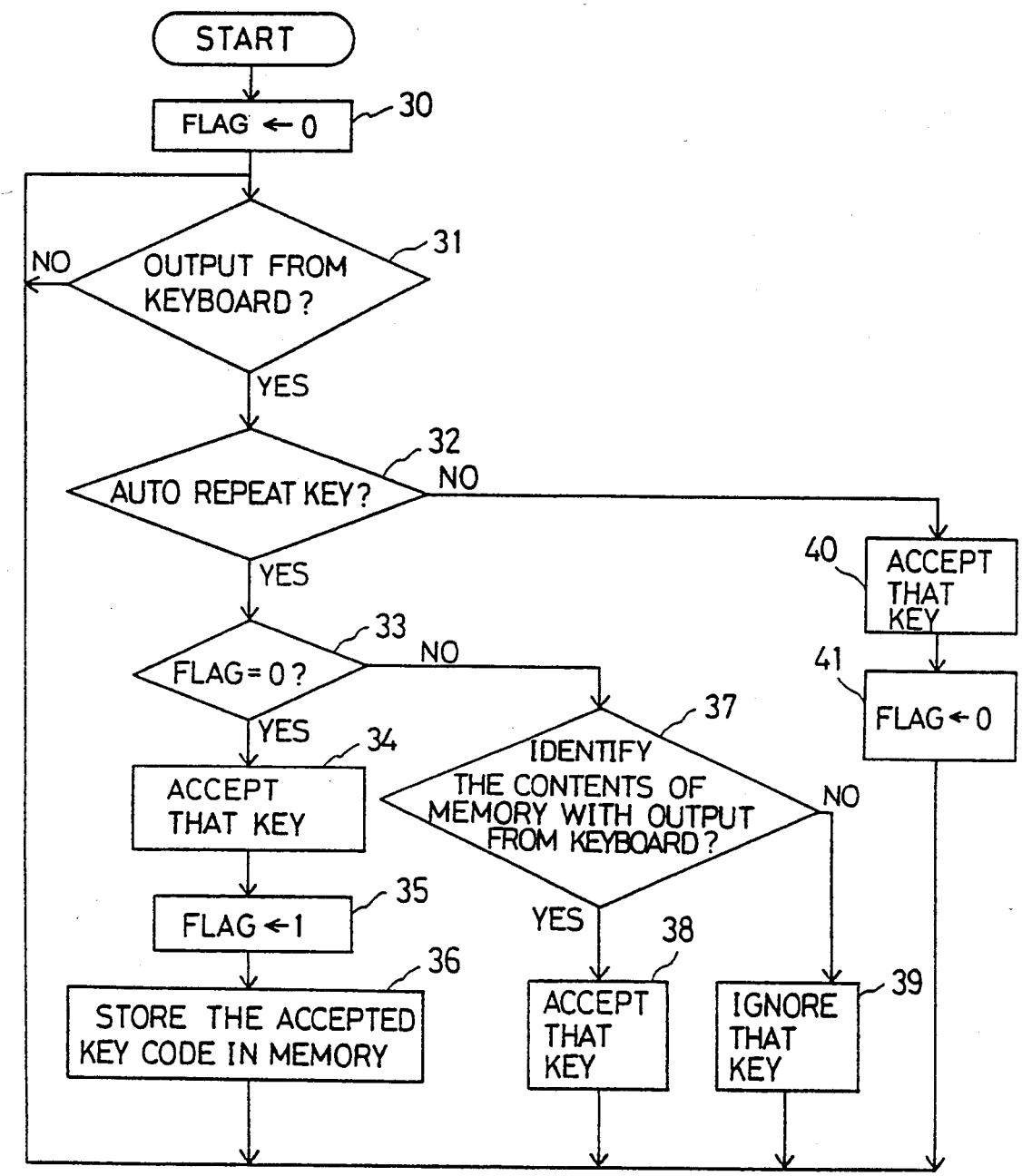
FIG. 3 is a flow chart for explaining an auto repeat key processing operation in the embodiment according to the first aspect of the present invention.

An operation of an auto repeat key processing will now be described in conjunction with a flow chart shown in FIG. 3.

Prior to the operation, a control flag 121 is cleared to zero for an initialization (Step 30). Then, assuming that an auto repeat key is pressed on the keyboard (1) 15, it is regarded as a first auto repeat key because a value of control flag 121 is zero. Then, the key is accepted (Step 34), the flag is set to "1" (Step 35), and a code allocated to the key is stored in the key code memory 122 (Step 36).

Then, as to the keys output from the keyboard after that, they are checked whether they are the auto repeat keys (Step 31→32). If they are the auto repeat keys, a state of the flag is further checked (Step 33).

When the same auto repeat key is successively output from the keyboard (1) 15 and the control flag 121 has been set to "1" in the previous step, a comparison is made between the auto repeat key and the key code stored in the key code memory 122 to determine if there is an agreement between them (Step 37). If so, the auto repeat key is accepted (Step 38).

When an auto repeat key is output from the keyboard (2) 16, with the control flag 121 having been earlier set to "1", a comparison is made between the auto repeat key and the key code stored in the key code memory 122 to determine if there is a disagreement between them. If so, the auto repeat key is ignored (Step 39).

When keys other than the auto repeat keys are output at Step 32, those keys are accepted (Step 40), and the control flag 121 is cleared to zero (Step 41). The control flag 121 is now reset for admitting a reception of another auto repeat key output.

Through the above-mentioned steps, even if different auto repeat keys are delivered from two keyboards, only the auto repeat key previously accepted is recognized. In this way random key input can be prevented.

Although two keyboards are employed in the description of this embodiment, it should be noted that the present invention can be applied to an architecture in which more than two keyboards are incorporated. As to the keyboards, a mouse, a pointing device, and the like may achieve similar effects.

Accordingly, in the first aspect of the present invention, even with an operation of auto repeat keys on different keyboards, only the auto repeat key previously pressed is recognized as being valid, and hence, an operation of the auto repeat keys can be exactly conducted.

Figure 4:
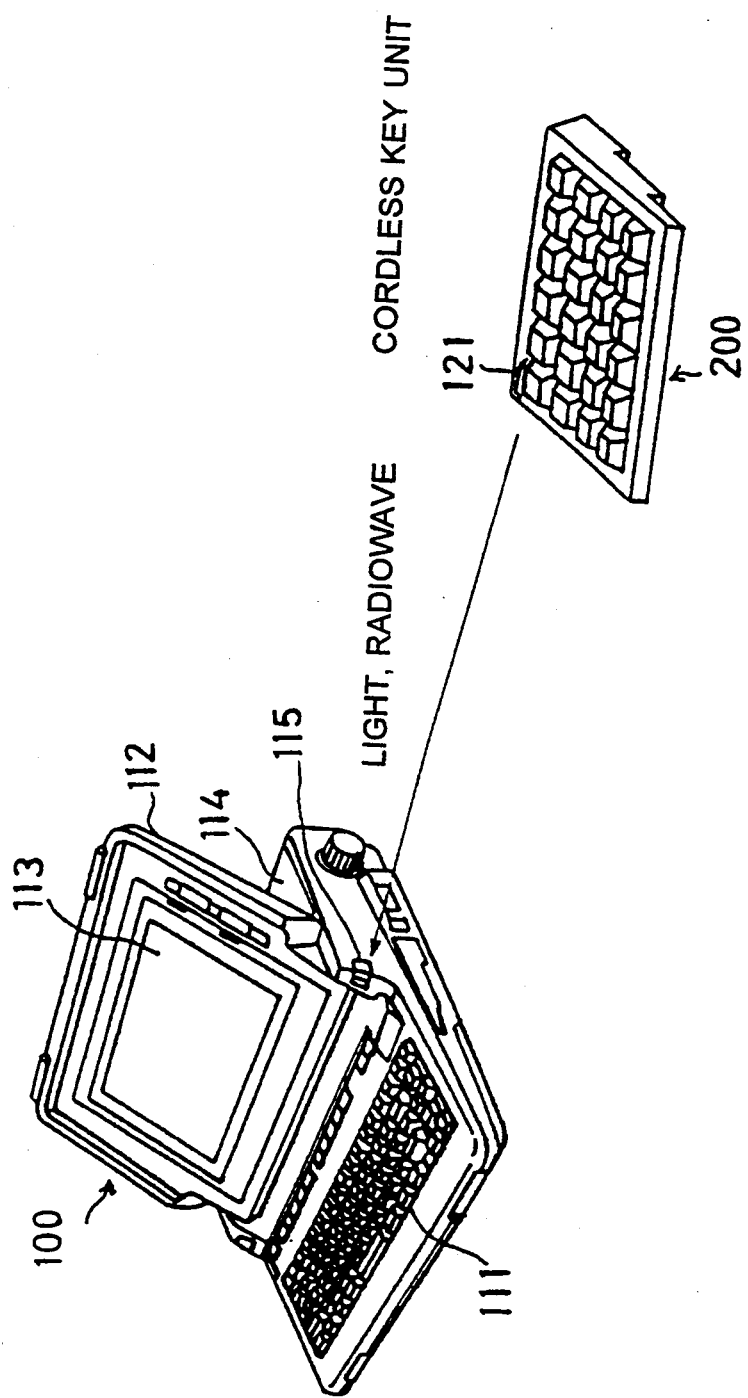
FIG. 4 is a perspective view showing an appearance of a system architecture of a preferred embodiment of a data processor according to a second aspect of the present invention.

FIG. 4 is a perspective view showing an appearance of an embodiment of a data processor to which the present invention is applied. The word processor includes a main unit 100 laptop word processor, and a cordless key unit 200 serving as a wireless input device. The main unit 100 has a keyboard 111, a liquid crystal display unit 113 in its pivotal top 112, and a printer 114 in its rear side. It also includes a wireless signal receiver 115, which is provided in an outer wall on a side of a main unit cabinet where the top 112 is pivotally fixed. The keyboard ill includes the same arrangement of keys as that of a conventional laptop word processor, but since an area for the keyboard is restricted as is common to this type of word processors, it does not have an additional independent set of ten keys 0–9 offset on the side of the main keyboard.

The cordless key unit 200 can be juxtaposed with the keyboard Ill on the right side of the keyboard 111, and it is a box-type unit which is sized so as to be held in the palm. The cordless key unit 200 is provided with a wireless signal transmitter 121 in a corner (left corner) of the box-type unit which is opposed to the receiver 115 of the main unit 100 when it is juxtaposed with the keyboard 111. Thus, when the cordless key unit 200 is set on the right side of the keyboard 111, the transmitter 121 and the receiver 115 are disposed facing each other.

FIG. 5 shows the key arrangement of the cordless key unit 200. FIG. 6 shows keys which operate as the function keys (by pressing function key (FUNC) to switch to the function mode) in FIG. 5, isolated from FIG. 5 for simplification of the explanation. identification of keys shown in FIG. 6 is marked differently in color from the keys in FIG. 5, on the surface or side face of corresponding keys. Thus, only ten numeral keys can be used on the cordless key unit 200 to perform editing functions, such as moving, copying, blocking, moving cursor, etc.

in FIG. 5, a MOVE CURSOR key is one of those auto repeat keys, and in FIG. 6, a SPACE key, a BACK SPACE key, key, a RULER LINE key, an UNDERLINE key are all auto repeat keys.

Figure 7:
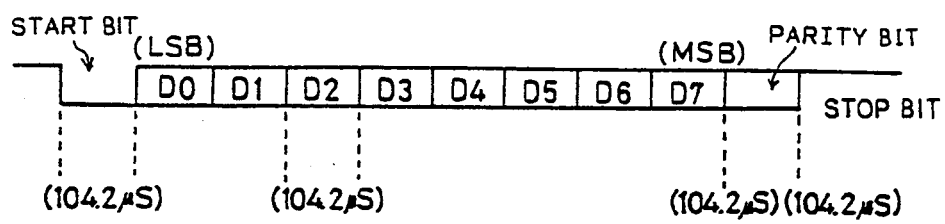
FIG. 7 is a diagram for explaining a structure of transmitted data in the cordless key unit in the embodiment according to the second aspect of the present invention.

FIG. 7 shows a structure of data transmitted from the cordless key unit 200 to the main unit 100. The data transmission begins with the least significant bit (LSB), and a start bit "0", a stop bit "1", and a parity bit, (e.g., odd parity so that the sum of "1"s is odd with the parity bit included)", are preset.

Figure 8:
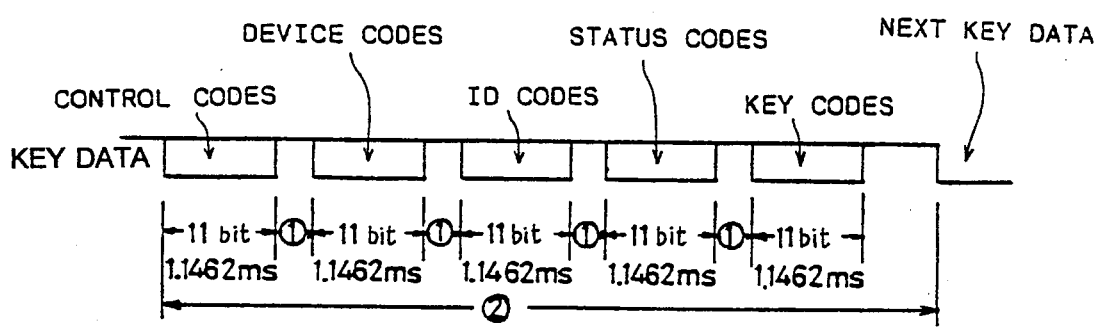
FIG. 8 is a diagram for explaining the order of the transmission of data shown in FIG. 7.

FIG. 8 shows an order of the transmitted data. In FIG. 8, ① indicates a waiting time of 104.2 μs across a data block (11 bits), ② indicates a waiting time of 20 ms or more until the next key data.

Figure 9:
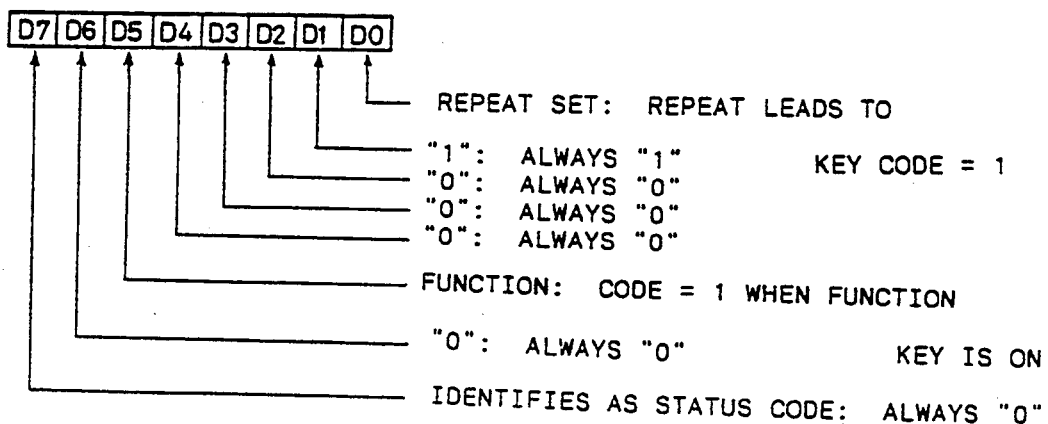
FIG. 9 is a diagram for explaining a bit structure of status codes shown in FIG. 8.
Figure 10:
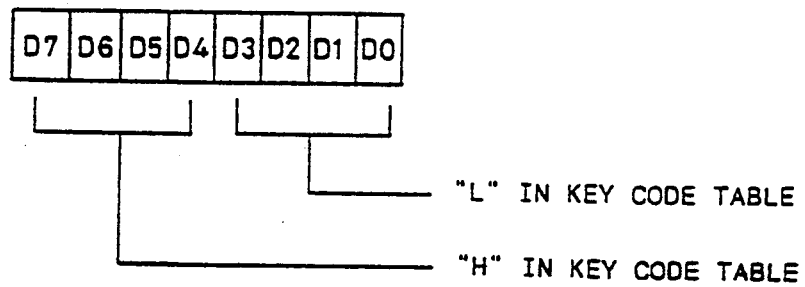
FIG. 10 is a diagram for explaining a structure of key codes shown in FIG. 9.

FIG. 9 shows bit structure of status codes in FIG. 8. Pressing a function key, a bit of D5 turns to "1", and code information about a key corresponding to an edit function which is pressed simultaneously with the function key is transmitted, as shown in FIG. 8, to the main unit 100 of the word processor in the total 5 byte code of information as shown in FIG. 10. Then, the 5 byte code of information transmitted to the main unit 100 is transferred to an optical signal control circuit 149 by a light/electricity converter 148 mentioned later, and furthermore, after operationally processed in a microprocessor 130, the information is transformed into the intended edit function (that which has been specified on the cordless key unit) and used for editing document data.

Figure 11:
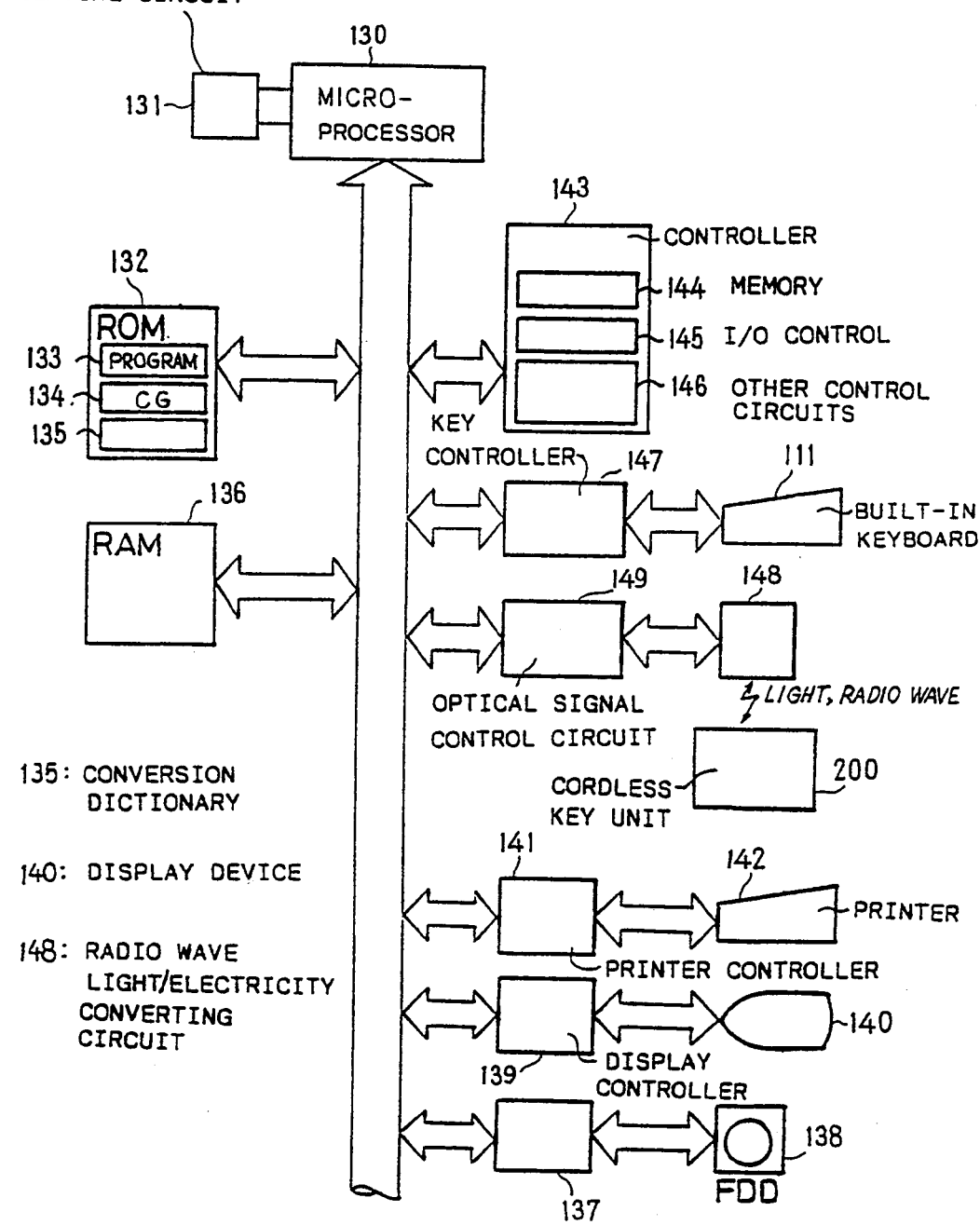
FIG. 11 is a block diagram showing an architecture of a main unit of the embodiment according to the second aspect of the present invention.
Figure 12:
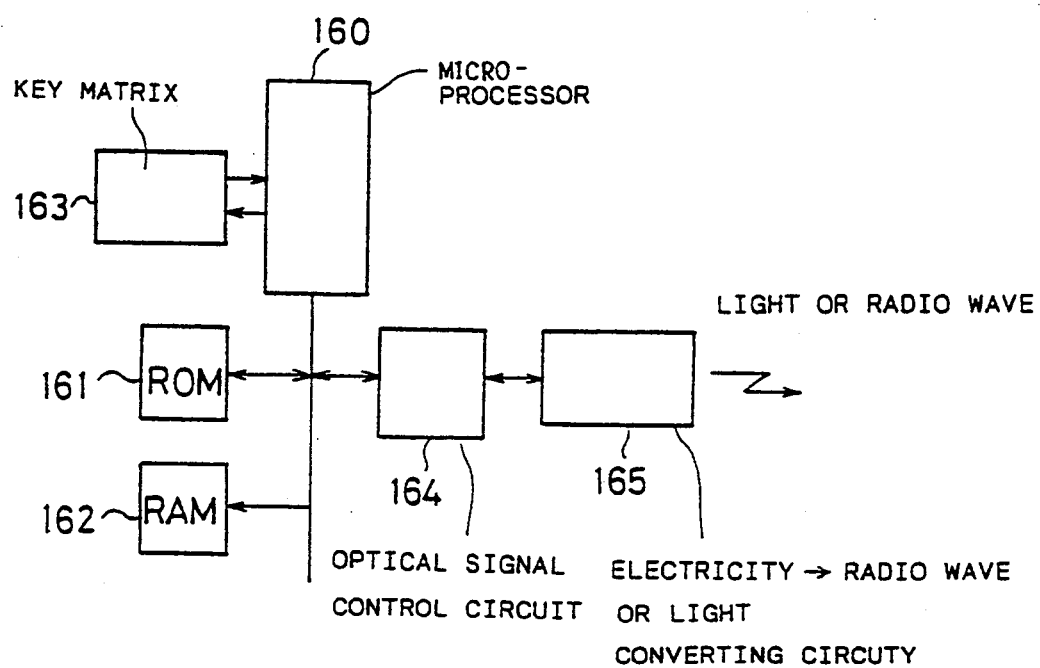
FIG. 12 is a block diagram showing an architecture of a cordless key unit of the embodiment according to the second aspect of the present invention.

FIG. 11 is a block diagram showing an architecture of the word processor main unit 100. FIG. 12 is a block diagram showing an architecture of the cordless key unit 200.

In FIG. 11, reference numeral 130 denotes a microprocessor consisting of a CPU which controls the operation in the main unit. The microprocessor 130 encodes key signals output from the cordless key unit 200 serving as a wireless input device and From the keyboard 111 of the main unit to perform a editing process.

Numeral 131 designates an oscillating circuit which produces a basic clock of the main unit to supply it to the CPU. A ROM 132 stores an operation program 133 for the main unit, a character generator (CG) 134, a conversion dictionary 135, etc., and supports the CPU in operation. A RAM 136 stores document data, control information, etc. generated by the word processor, and similarly supports the CPU in operation. A floppy disk controller (FDC) 187 connects a floppy disk (not shown) to the main unit 100 through a floppy disk drive (FDD) 188.

A display controller 139 controls a display device 140. In the preferred embodiment, the display device consists of a liquid crystal display apparatus. A printer controller 141 controls an printing operation of a printer 142. A controller 143 consisting of a memory 144, and I/O control 145, and other control circuits 146 administrates the memory 144 on data writing/reading and also administrates control signals For connecting I/O and the like.

Key input from keyboard 111 is connected to a key controller 147. Input from the key unit 200 is connected to the CPU through the optical signal control circuit 149 and a radio wave, light to electricity converting circuit 148.

In a configuration of the cordless key unit 200 shown in FIG. 12, the microprocessor 160 consisting of the CPU controls the cordless key unit 200. The microprocessor 160 prevents successive inputs of a specific one of the auto repeat keys in the cordless key unit 200. In other words, when the specific auto repeat key is pressed on unit 200, the corresponding key code is output by a single pulse. Thereafter, no subsequent similar specific input is accepted even if the auto repeat key is continuously pressed.

The "specific" auto repeat key is defined as a key which causes erasure of data with successive key inputs such as the BACK SPACE key, the ERASE key, etc., but not keys having no effect on data such as the MOVE CURSOR key, the UNDERLINE key, etc.

A ROM 161 stores a control program for the cordless key unit 200. A RAM 162 is used during execution of the program. Keys on the cordless key unit are included in a key matrix 163, and their arrangement is shown in FIGS. 5 and 6. Key input signals generated From the key matrix 168 are converted into wireless signals through an optical signal control circuit 164 and an electricity to radio wave/light converting circuit 165 and Further transmitted to the main unit 100 through aerial propagation.

Although the for making the successive input on the specific auto repeat key impossible is preferably provided in the cordless key unit, it may alternatively be provided in the word processor main unit. It also may be provided in both reliability of the key input operation when the keyboard in the main unit and the wireless input device are used together is further enhanced.

Preferred embodiments of the present invention have been described as examples of the invention as claimed. However, the present invention should not be limited in its application to the details illustrated in the accompanying drawings and the specification, since this invention may be practiced or constructed in a variety of different embodiments. Also, it must be understood that the terminology and descriptions employed herein are used solely for the purpose of describing the general operation of the preferred embodiment and therefore should not be construed as limitations on the operability of the invention.

What is claimed is:

1. A data processing apparatus for use by an operator to edit text in a document stored in a document memory comprising:

first and second keyboards each having a plurality of depressable keys some of which are auto repeat keys that are typically depressed in repeated sequential fashion during text creations and editing, each key generating a corresponding key code signal when depressed by the operator;

an input buffer, connected to the first and second keyboards, for serially storing in first-in-first-out (FIFO) fashion key codes corresponding to keys depressed on the first and second keyboards; and a central processing unit for retrieving the serially stored key codes from the input buffer in FIFO fashion during editing of the document, detecting a first processed key code corresponding to an auto repeat key and editing the document in accordance with the first processed auto repeat key code, editing the document in accordance with subsequently retrieved auto repeat key codes identical to the first processed auto repeat key code, and ignoring subsequently retrieved auto repeat key codes that are different from the first processed auto repeat key code.

2. The apparatus as in claim 1, wherein the means for detecting sets a flag upon detecting the first processed auto repeat key code and resets the flag upon detecting a key code other than an auto repeat key code.

3. The apparatus as in claim 2, wherein the means for editing edits the document in accordance with subsequently retrieved auto repeat key codes different from the first processed auto repeat key code when the flag is reset.

4. A data processing apparatus as in claim 1, wherein the auto repeat keys include a cursor movement key, an underline key, a space key, or a backspace key.

5. A data processing apparatus for editing text in a document comprising:

first and second keyboards each having a plurality of depressable keys some of which are auto repeat keys that are typically depressed in repeated sequential fashion during text creations and editing, each key generating a corresponding key code signal when depressed;

a central processing unit for receiving key codes from the first keyboard through a hardwired communications link and from the second keyboard over a wireless communications link including means for rejecting successive auto repeat key codes received from at least one of the first and second keyboards.

6. The apparatus as in claim 5, wherein successive auto repeat key codes from the second keyboard are rejected.

7. The apparatus as in claim 5, wherein the auto repeat keys include a back space key or an erase key.

* * * * *